US012012178B2

(12) United States Patent
Fernandez Ibañez et al.

(10) Patent No.: US 12,012,178 B2
(45) Date of Patent: Jun. 18, 2024

(54) ANCHOR DEVICE FOR ANCHORING A FLOATING STRUCTURE TO THE SEABED AND INSTALLATION METHOD OF THE ANCHOR DEVICE

(71) Applicants: VICINAY MOORING CONNECTORS, S.A., Galdames (ES); VICINAY MARINE INNOVACION (AIE), Leioa (ES)

(72) Inventors: Jonathan Fernandez Ibañez, Leioa (ES); Jorge Altuzarra Maestre, Leioa (ES); Nagore Abrisketa Lozano, Leioa (ES)

(73) Assignees: VICINAY MOORING CONNECTORS, S.A., Galdames (ES); VICINAY MARINE INNOVACION (AIE), Leioa (ES)

( * ) Notice: Subject to any disclaimer, the term of this patent is extended or adjusted under 35 U.S.C. 154(b) by 163 days.

(21) Appl. No.: 17/868,075

(22) Filed: Jul. 19, 2022

(65) Prior Publication Data

US 2023/0024467 A1  Jan. 26, 2023

(30) Foreign Application Priority Data

Jul. 26, 2021  (EP) ..................................... 21382686

(51) Int. Cl.
*B63B 21/50* (2006.01)
*B63B 21/20* (2006.01)
(Continued)

(52) U.S. Cl.
CPC .............. *B63B 21/50* (2013.01); *B63B 21/20* (2013.01); *B63B 21/26* (2013.01); *E02D 5/80* (2013.01)

(58) Field of Classification Search
CPC ......... B63B 21/24; B63B 21/26; B63B 21/50; E21D 21/0086; E02D 5/80; E02D 5/801
(Continued)

(56) References Cited

U.S. PATENT DOCUMENTS

| 759,759 A | * | 5/1904 | Shepard et al. | ........ E02D 5/801 |
| | | | | 52/157 |
| 2,870,884 A | * | 1/1959 | Mazur | ....................... E02D 5/80 |
| | | | | 52/158 |

(Continued)

FOREIGN PATENT DOCUMENTS

| CN | 107268591 A | * | 10/2017 | ............. E02D 27/50 |
| CN | 113071605 A | * | 7/2021 | ............. B63B 21/50 |

(Continued)

OTHER PUBLICATIONS

European Search Report, EP21382686, Jan. 13, 2022, 7 pages.

*Primary Examiner* — Frederick L Lagman
(74) *Attorney, Agent, or Firm* — Edell, Shapiro & Finnan, LLC

(57) ABSTRACT

An anchor device for anchoring a floating structure to the seabed with an anchor chain having a shackle at one end of the chain. The anchor device includes a mooring bolt for being inserted into a borehole drilled in the seabed and a support plate having a lower face for resting on the seabed and an upper face with a through hole through which the mooring bolt passes through the support plate for being inserted into the borehole. The upper face of the support plate has a connection point for coupling the shackle of the end of the chain, such that when the floating structure is anchored to the seabed, the chain is subjected to tensile stresses causing a force to be applied at the connection point and not directly to the mooring bolt.

12 Claims, 7 Drawing Sheets

(51) Int. Cl.
  *B63B 21/26* (2006.01)
  *E02D 5/80* (2006.01)
(58) Field of Classification Search
  USPC .................... 405/227, 228, 302.1; 52/166
  See application file for complete search history.

(56) References Cited

U.S. PATENT DOCUMENTS

| | | | | |
|---|---|---|---|---|
| 5,515,656 | A * | 5/1996 | Mihalich | B64F 1/12 |
| | | | | 248/156 |
| 6,223,671 | B1 * | 5/2001 | Head | E02D 5/805 |
| | | | | 114/295 |
| 9,133,594 | B2 * | 9/2015 | Hurley | E02D 5/80 |
| 9,340,945 | B1 * | 5/2016 | Bye | E02D 5/80 |
| 10,119,237 | B2 * | 11/2018 | Vasey | B63B 21/26 |
| 2009/0123235 | A1 * | 5/2009 | Maconochie | B63B 21/27 |
| | | | | 405/227 |
| 2015/0063910 | A1 * | 3/2015 | Meltsov | F03B 13/262 |
| | | | | 114/230.14 |
| 2015/0259043 | A1 * | 9/2015 | Bauer | B63B 21/26 |
| | | | | 114/230.22 |
| 2018/0216306 | A1 * | 8/2018 | Gregg | E04H 12/22 |

FOREIGN PATENT DOCUMENTS

| | | | | |
|---|---|---|---|---|
| CN | 218662270 | U * | 3/2023 | ............ B63B 21/24 |
| EP | 2955096 | A1 * | 12/2015 | ............ B63B 21/20 |
| FR | 3031495 | A1 | 7/2016 | |
| GB | 2578948 | A * | 6/2020 | ............ B63B 21/26 |
| IT | RM20100393 | A1 | 1/2012 | |
| JP | H0285089 | A | 3/1990 | |
| KR | 101876563 | B1 | 7/2018 | |
| WO | 2006112821 | A1 | 10/2006 | |
| WO | 2012007983 | A1 | 1/2012 | |

* cited by examiner

ANCHOR DEVICE FOR ANCHORING A FLOATING STRUCTURE TO THE SEABED AND INSTALLATION METHOD OF THE ANCHOR DEVICE

CROSS-REFERENCE TO RELATED APPLICATIONS

The present application claims the benefit and priority to European Application No. EP21382686.0, filed Jul. 26, 2021.

FIELD

The present invention relates to anchor devices for anchoring floating structures to the seabed by means of anchor chains.

BACKGROUND

Floating structures have to be anchored to the seabed to prevent sea currents or atmospheric conditions from being able to move them from their location. Anchor chains attaching the floating structures to anchor devices which are arranged in the seabed are used for that purpose.

In sandy seabeds, an anchor or a pile can be used as an anchor device, but in rocky seabed, it is necessary to use a mooring bolt which is inserted into a borehole that has previously been drilled in the seabed.

For example, NO20170963A1 shows an anchor device for anchoring an aquaculture floating structure to the seabed using an anchor chain having a shackle at one end of the anchor chain. The anchor device comprises a T-shaped mooring bolt for being inserted into a borehole drilled in the seabed and a support plate having a lower face for resting on the seabed and an upper face with a through hole in which the mooring bolt passing through the support plate for being inserted into the borehole drilled in the seabed is arranged.

The anchor chain is attached at one end to the floating structure and is attached at the other end to the anchor device by means of the shackle. The shackle is D-shaped and is coupled directly to the mooring bolt, with the shackle being retained between the support plate and a crossbar that the mooring bolt has in its upper part. In this arrangement, when the floating structure is anchored to the seabed with the anchor device, the anchor chain is subjected to tensile stresses and a force is generated directly in the attachment between the shackle and the mooring bolt which tends to take the mooring bolt out of the borehole of the seabed in which it is inserted.

SUMMARY

The object of the invention is to provide an anchor device for anchoring a floating structure to the seabed and an installation method of the anchor device, as defined in the claims.

One aspect of the invention relates to an anchor device for anchoring a floating structure to the seabed with an anchor chain having a shackle at one end of the anchor chain. The anchor device comprises a mooring bolt for being inserted into a borehole drilled in the seabed and a support plate having a lower face for resting on the seabed and an upper face with a through hole in which the mooring bolt passing through the support plate for being inserted into the borehole drilled in the seabed is arranged, wherein the upper face of the support plate has a connection point for coupling the shackle of the end of the anchor chain.

When the floating structure is anchored to the seabed with the anchor device, the anchor chain is subjected to tensile stresses, and a force is generated in the connection point of the support plate in which the shackle of the anchor chain is coupled, whereas the mooring bolt is not subjected directly to said force, preventing it from being taken out of the borehole of the seabed in which it is inserted.

In the anchor devices of the state of the art, such as the one shown in NO20170963A1, the force is generated directly on the mooring bolt, since the shackle of the chain is connected to the mooring bolt, such that said force tends to take the mooring bolt out of the borehole drilled in the seabed. In the anchor device of the invention, the tensile stress of the chain is transmitted directly to the connection point of the support plate and not to the mooring bolt which is arranged in a different part of the support plate. Furthermore, the support plate itself allows that force to be transmitted to the seabed, whereby considerably reducing stress on the mooring bolt, and therefore reducing the risk of the mooring bolt coming out of the borehole.

Another aspect of the invention relates to an installation method of the anchor device comprising the steps of:
 drilling a borehole in the seabed,
 introducing a fixing material in the borehole,
 taking the anchor device to the seabed, and
 introducing the mooring bolt of the anchor device in the borehole with the lower face of the support plate resting on the seabed.

These and other advantages and features of the invention will become apparent in view of the figures and the detailed description of the invention.

DETAILED DESCRIPTION

Figure 1:
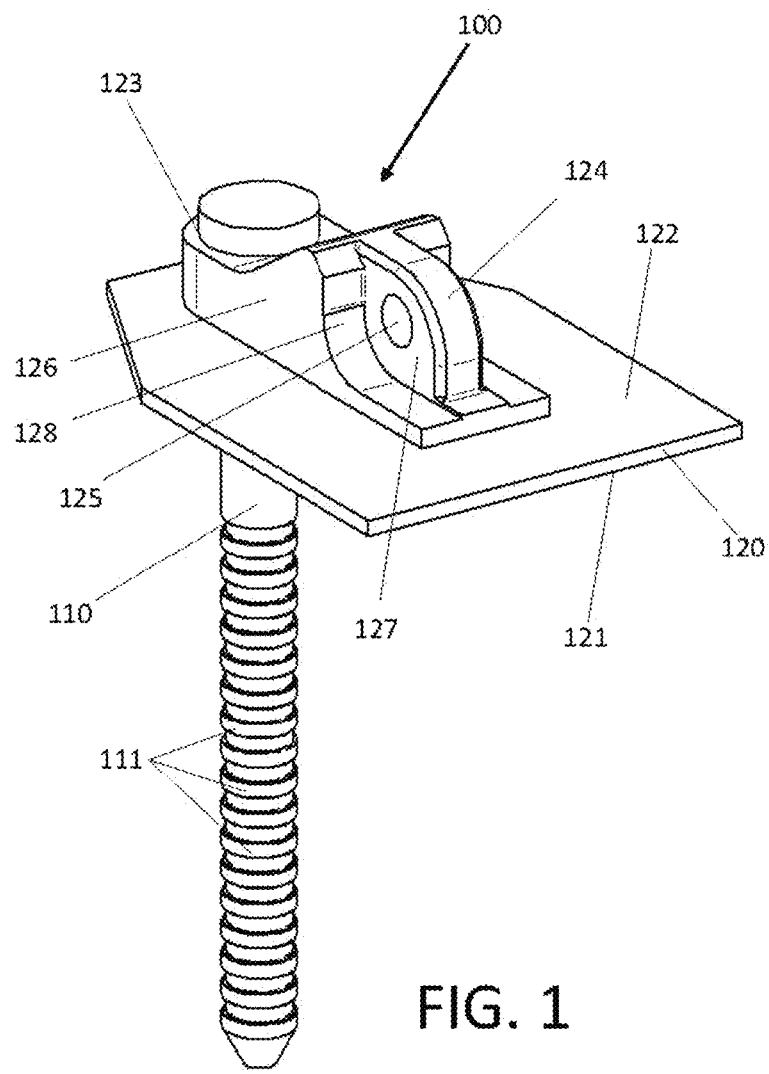
FIG. 1 shows a perspective view of the anchor device according to an example of the invention.

The invention relates to an anchor device 100 for anchoring a floating structure 300 to the seabed 1 with an anchor chain 200 having a shackle 210 at one end of the anchor chain 200.

The anchor device 100 is suitable for being arranged in a rocky seabed and anchoring an aquiculture floating structure 300, such as a sea farm; however, it can be used in a sandy seabed and for anchoring another type of floating structures 300.

When the floating structure 300 is anchored, the anchor device 100 is attached to the shackle 210 of the end of the anchor chain 200 and the floating structure 300 is attached to the other end of the anchor chain 200. That other end of the anchor chain 200 can be coupled directly to the floating structure 300, or indirectly by means of additional anchor chains.

The anchor device 100 comprises a mooring bolt 110 for being inserted into a borehole 2 drilled in the seabed 1 and a support plate 120 having a lower face 121 for resting on the seabed 1 and an upper face 122 with a through hole 123 in which the mooring bolt 110 passing through the support plate 120 for being inserted into the borehole 2 drilled in the seabed 1 is arranged, wherein the upper face 122 of the support plate 120 has a connection point 124 for coupling the shackle 210 of the end of the anchor chain 200, such that when the floating structure 300 is anchored to the seabed 1 with the anchor device 100, the anchor chain 200 is subjected to tensile stresses and a force F is generated in the connection point 124 of the support plate 120 in which the shackle 210 of the anchor chain 200 is coupled, such that the mooring bolt 110 is not subjected directly to said force F.

The support plate 120 is a planar part, preferably made of metal, with a smaller thickness compared with its cross-section and longitudinal section. The dimensions of the support plate 120 are selected based on factors such as the type of seabed, the depth, the size of the floating structure, the length of the mooring bolt, among others.

The support plate 120 extends around the through hole 123 in which the mooring bolt 110 is arranged and around the connection point 124 in which the shackle 210 is coupled. The support plate 120 thereby extends horizontally over the seabed 1 and generates a support area around the mooring bolt 110 and around the connection point 124, whereby the stresses generated on said areas due to the pulling of the anchor chain 200 are transmitted to the seabed 1. As shown in the figures, the support plate 120 has a substantially rectangular planar shape; however, it could have any other type of planar shape, without this altering the concept of the invention.

The connection point 124 has a hole 125 for receiving a pin 230 coupling the shackle 210 of the end of the anchor chain 200 to the anchor device 100, such that a rotatably articulated connection is established between the anchor device 100 and the anchor chain 200, whereby the anchor device 100 is only affected by tensile stresses of the chain 200.

As observed in the figures, the mooring bolt 110 is perpendicular to the support plate 120. The mooring bolt 110 is thereby arranged in the vertical position for being inserted into the borehole 2 of the seabed 1 and the support plate 120 is arranged in the horizontal position for resting on the seabed 1. This arrangement is suitable for seating the anchor device in a substantially planar seabed 1 and for achieving correct support on the bed; however, based on the orography of the seabed, it may be necessary for the mooring bolt 110 to be inclined with respect to the support plate 120.

Preferably, the mooring bolt 110 has annular notches 111 which allow the mooring bolt 110 to be adjusted in the borehole 2 drilled in the seabed 1. The annular notches 111 are parallel to one another and extend along the mooring bolt 110, such that the mooring bolt 110 has on its outer perimetral contour a set of annular protrusions and recesses.

Preferably, as shown in the example of FIG. 1, the support plate 120 comprises a protrusion 126 projecting vertically from the upper face 122 of the support plate 120, with the protrusion 126 having a first end in which the through hole 123 is arranged and a second end, which is opposite the first end, in which the connection point 124 is arranged.

Preferably, the protrusion 126 has a substantially rectangular shape and is integrally attached to the upper face 122 of the support plate 120 by means of welding, screws, or a similar means of attachment. Alternatively, the protrusion 126 and the support plate 120 can be a single part, for example, manufactured by machining or casting. Preferably, the connection point 124 is made directly at the second end of the protrusion 126 and is part of the protrusion 126.

The protrusion 126 increases the stiffness of the anchor device 100 and reinforces the two points of the anchor device 100 at which most of the stresses are concentrated, said points being the connection area between the shackle 210 and the connection point 124 of the anchor device 100, and the connection area between the seabed 1 and the mooring bolt 110 of the anchor device 100.

Figure 4:
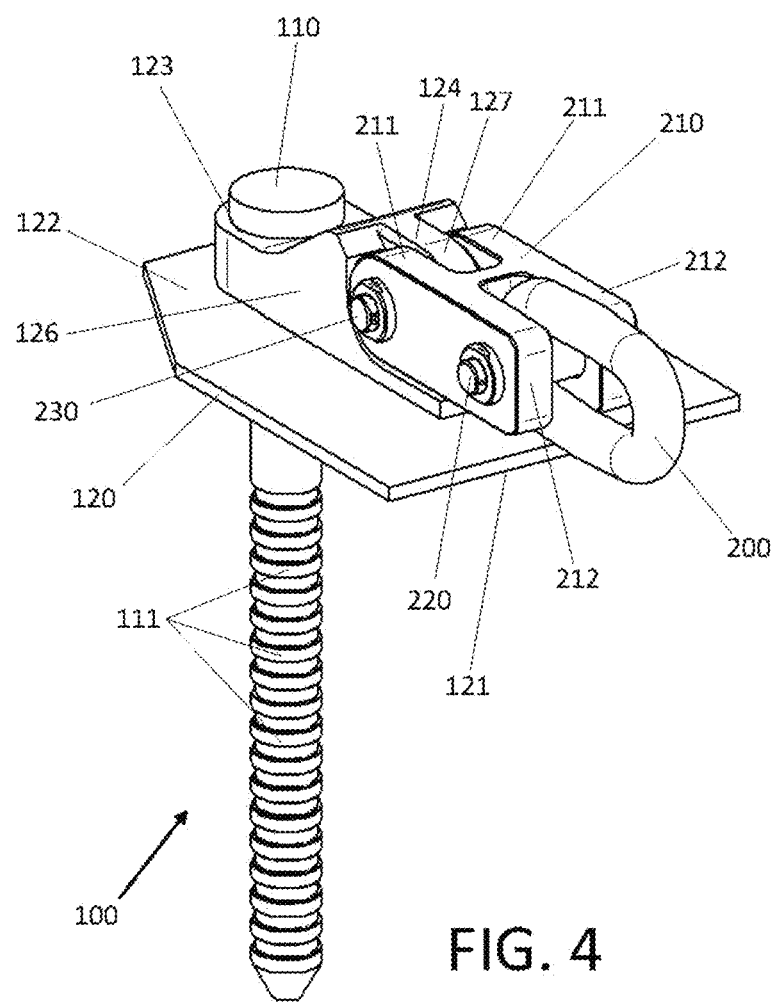
FIG. 4 shows a perspective view of the anchor device of FIG. 1 with the shackle of the anchor chain coupled.

The example of FIG. 4 shows an H-shaped shackle 210, however, the shackle 210 can have any other shape, such as a Y-shaped shackle for example.

The H-shaped shackle 210 has a first end with two parallel protruding portions 211 between which there is defined an opening for arranging the connection point 124, and a second end with two other parallel protruding portions 212 between which there is defined another opening for arranging the last link of one end of the anchor chain 200. Each of the protruding portions 211 of the first end of the shackle 210 has a hole which is aligned with the hole 125 of the connection point 124 for receiving the pin 230 and coupling the shackle 210 with the anchor device 100, whereas each of the protruding portions 212 of the second end of the shackle 210 has another hole for receiving another pin 220 coupling the shackle 210 with the last link of the end of the anchor chain 200.

In the case of a Y-shaped shackle, the second end of the shackle has two protruding portions 212 like the H-shaped shackle, but the first end of the shackle has a single protruding portion 211, and the one having two protruding portions to define an opening in which the protruding portion 211 of the first end of the Y-shaped shackle fits is the connection point 124 of the anchor device 100.

Figure 2:
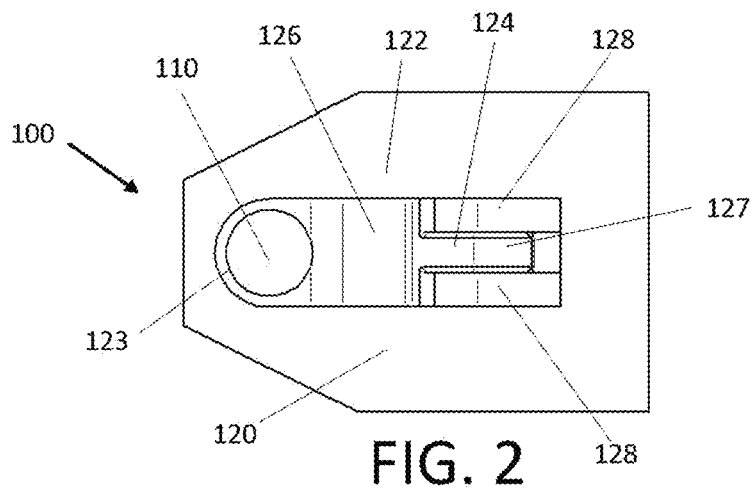
FIG. 2 shows a plan view and FIG. 3 shows a side view of the anchor device of FIG. 1.
Figure 3:
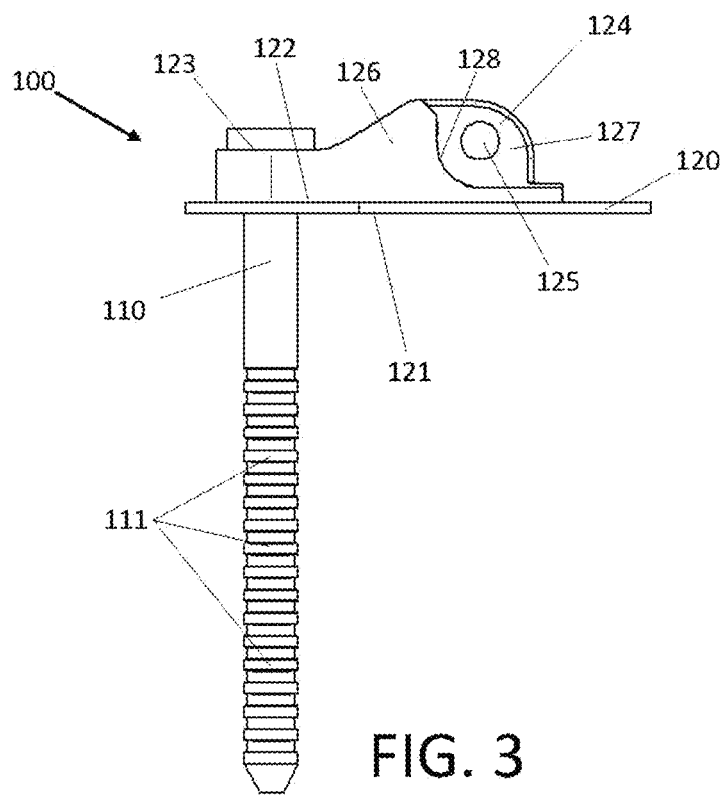

When an H-shaped shackle is used, and as observed in detail in FIGS. 1 and 2, the second end of the protrusion 126 in which the connection point 124 is arranged has a smaller thickness than the rest of the protrusion 126. The second end of the protrusion 126 has a protruding vertical portion 127 in which the hole 125 of the connection point 124 is arranged and two recessed portions 128 arranged on each side of the protruding vertical portion 127 in which the shackle 210 rests. The two parallel protruding portions 211 of the first end of the shackle 210 thereby rest in the two recessed portions 128 of the protrusion 126 of the support plate 120, and the protruding vertical portion 127 of the protrusion 126 of the support plate 120 is arranged in the opening defining the two parallel protruding portions 211 of the first end of the shackle 210.

Figure 5:
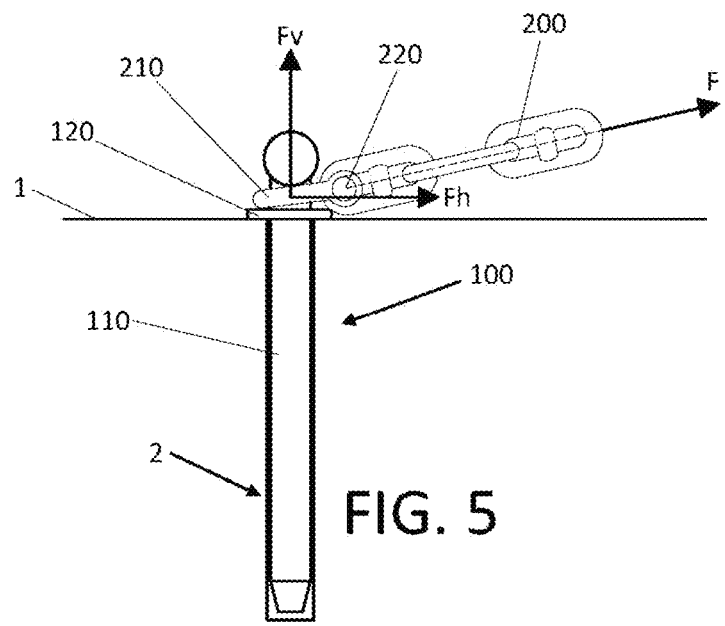
FIG. 5 shows a schematic view of the distribution of forces generated in an anchor device according to the prior art with the shackle of an anchor chain coupled directly in the mooring bolt.
Figure 6:
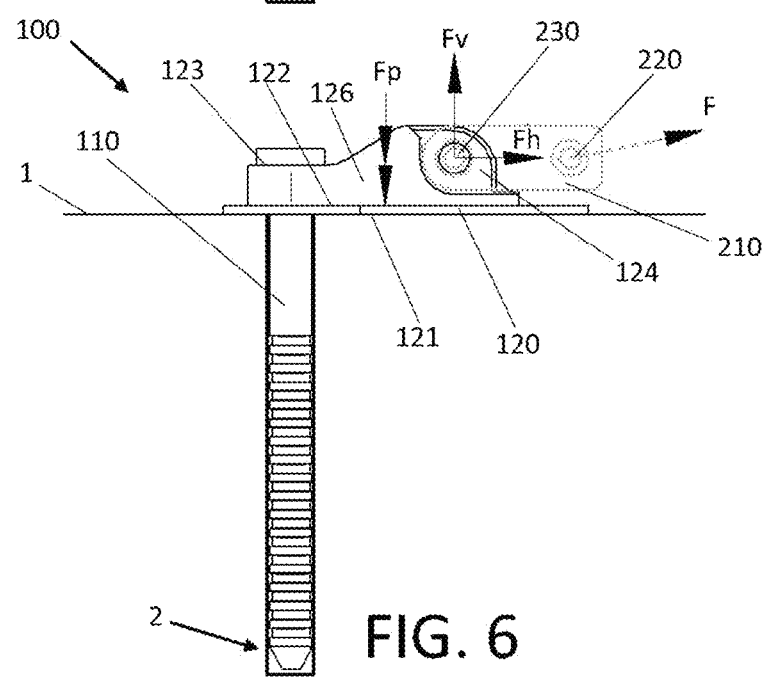
FIG. 6 shows a schematic view of the distribution of forces generated in the anchor device of FIG. 1.

FIGS. 5 and 6 show a comparison of the distribution of forces generated in an anchor device according to the prior art (see FIG. 5) compared with the anchor device of the invention (see FIG. 6). The same reference numbers are used to refer to similar elements.

FIG. 5 shows an anchor device 100 according to the prior art comprising a T-shaped mooring bolt 110 for being inserted into a borehole 2 drilled in the seabed 1 and a support plate 120 having a lower face for resting on the seabed and an upper face with a through hole in which the mooring bolt 110 passing through the support plate 120 for being inserted into the borehole 2 drilled in the seabed 1 is arranged. A floating structure is anchored to the anchor device 100 by means of an anchor chain 200 having at one end a D-shaped shackle 210. The shackle 210 is coupled directly to the mooring bolt 110, with the shackle 210 being retained between the support plate 120 and a crossbar that the mooring bolt 110 has in its upper part. In this arrangement, when the floating structure is anchored to the seabed 1 with the anchor device 100, the anchor chain 200 is subjected to tensile stresses, and a force F is generated directly in the attachment between the shackle 210 and the mooring bolt 110 which tends to take the mooring bolt out of the borehole of the seabed in which is inserted. The chain 200 is generally inclined with respect to the seabed 1, such that the force F can be broken down into a vertical force component Fv and a horizontal force component Fh, with the vertical force component Fv being the one causing the bolt 110 to be taken out.

FIG. 6 shows that when the floating structure is anchored to the seabed 1 with the anchor device 100, the anchor chain 200 is subjected to tensile stresses and a force F is generated at the connection point 124 of the support plate 120 in which the shackle 210 of the anchor chain 200 is coupled, whereas the mooring bolt 110 is not subjected directly to said force F, preventing it from being taken out of the borehole 2 of the seabed 1 in which it is inserted.

The force F is broken down into a vertical force component Fv and a horizontal force component Fh; the vertical force component Fv tends to lift the support plate 120 from the seabed 1, but since the support plate 120 is anchored in the seabed 1 by means of the bolt 110, the support plate 120 tends to pivot around the bolt 110, such that a pushing force Fp against the seabed 1, which is contrary to the vertical force component Fv, is generated and tends to keep the bolt 110 inserted into the borehole 2 of the seabed. The vertical force component Fv affecting the anchor device 100 is thereby considerably reduced, and the tensile stresses of the chain 200 are essentially reduced to the horizontal force component Fh, so the mooring bolt 110 is only subjected to shear stresses.

FIGS. 7 to 12 show the steps of the installation method of the anchor device 100 in the seabed 1 where the floating structure 300 is going to be located.

Figure 7:
FIGS. 7 to 12 show an example of the steps for installing the anchor device of FIG. 1 in the seabed.
Figure 7:
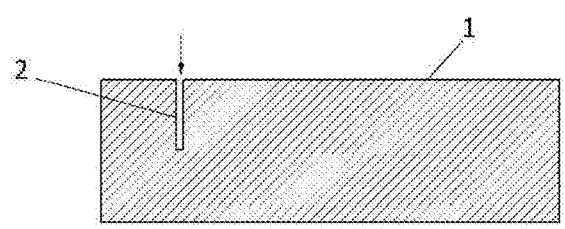

The first step shown in FIG. 7 comprises drilling a borehole 2 in the seabed 1. In this step, a vessel 3 provided with drilling and excavation equipment for clearing the rocky seabed 1, drilling the borehole 2, and levelling the surface of the seabed 1 to enable arranging the anchor device 100 is taken to the location.

Figure 8:
Figure 8:
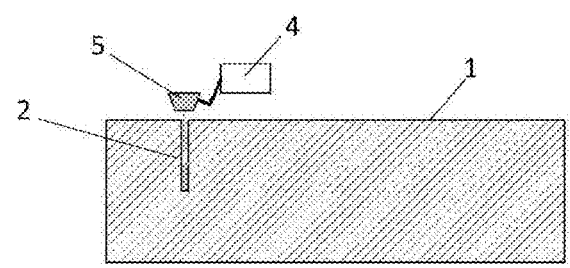

The second step shown in FIG. 8 comprises introducing a fixing material in the borehole 2. In this step, a bucket 5 with the fixing material is taken to the seabed 1 and the borehole 2 is filled with the fixing material by means of a ROV (remotely operated vehicle) 4.

Figure 9:
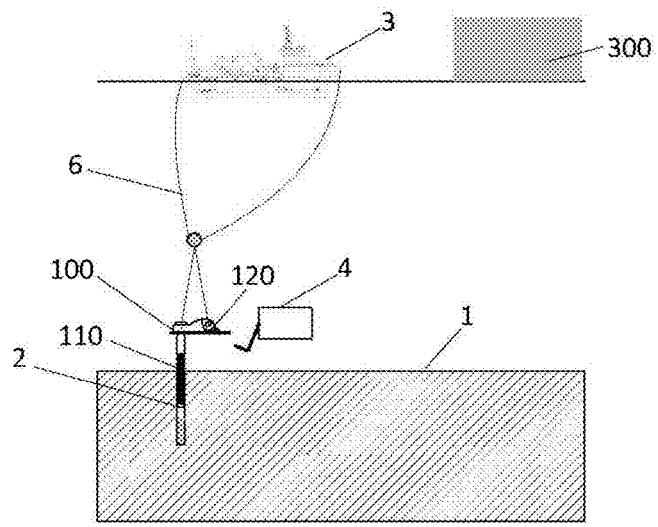

The third step shown in FIG. 9 comprises taking the anchor device 100 to the seabed 1. In this step, by means of a vessel 3, which can be the same vessel or another vessel other than the one used in the preceding steps, by means of cables 6 the anchor device 100 is taken to the seabed and by means of an ROV 4 the mooring bolt 110 is aligned for inserting it into the borehole 2. At this time or in a later step, the floating structure 300 is taken to the location to be anchored with the anchor device 100.

Figure 10:
Figure 10:
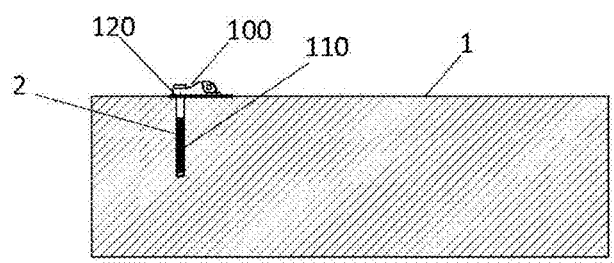

The fourth step shown in FIG. 10 comprises introducing the mooring bolt 110 of the anchor device 100 in the borehole 2 with the lower face 121 of the support plate 120 resting on the seabed 1.

Figure 11:
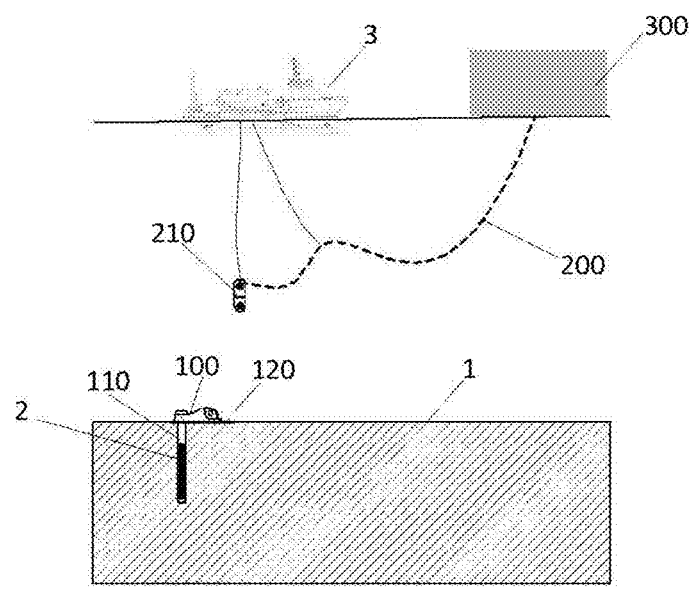
Figure 12:
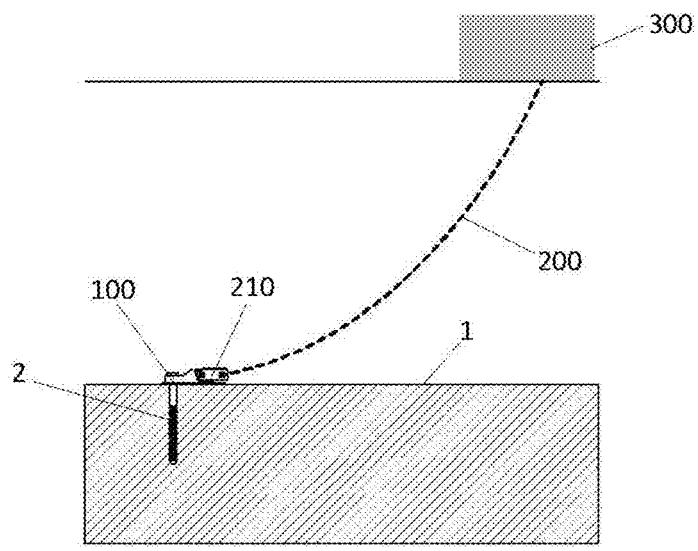

Subsequently, as shown in FIG. 11, the anchor chain 200 with the shackle 210 is taken to the seabed 1, and subsequently, as shown in FIG. 12, the shackle 210 of the anchor chain 200 is coupled with the anchor device 100, and the chain 200 is pulled taut, with the floating structure 300 being anchored to the seabed 1. By means of an ROV, the shackle 210 is arranged in the connection point 124 of the anchor device 100 and the pin 230 is introduced in the hole 125 of the connection point 124, locking the shackle 210 in the connection point 124 of the anchor device 100.

As shown in FIG. 11, the anchor chain 200 has one end attached to the floating structure 300 and other end attached to the shackle 210; however, the anchor chain 200 may not be attached to the floating structure 300 and have a free end, such that said free end is arranged in the seabed 1 until the floating structure 300 is required to be anchored, and at that time said free end can be connected with another anchor chain which is attached to the floating structure 300.

In FIG. 9, the anchor device 100 is taken to the seabed 1 alone; however, and alternatively, the anchor device 100 is taken to the seabed 1 together with the anchor chain 200, with the shackle 210 of the anchor chain 200 being coupled to the connection point 124 of the support plate 120. Generally, in this case the anchor chain 200 has a free end for subsequently being coupled with another anchor chain which is attached to the floating structure 300.

What is claimed is:

1. An anchor device for anchoring a floating structure to a seabed using an anchor chain having a shackle coupled to an end portion of the anchor chain, the anchor device comprising:
   a mooring bolt configured to be inserted into a borehole drilled in the seabed; and
   a support plate having a first side for resting on the seabed and a second side opposite the first side, the support plate including a hole extending between and through the first and second sides in which the mooring bolt passes for being inserted into the borehole, the support plate including a connection point for coupling the shackle, the connection point being spaced horizontally apart from the hole, the support plate including a protrusion that projects vertically from the second side, the protrusion having a first end portion in which the hole through which the mooring bolt passes is arranged and a second end portion, opposite the first end portion, in which the connection points is arranged.

2. The anchor device according to claim 1, wherein portions of the support plate extend around both the hole and the connection point.

3. The anchor device according to claim 2, wherein the connection point comprises a hole configured to receive a pin for coupling the shackle with the connection point.

4. The anchor device according to claim 2, wherein the mooring bolt is arranged perpendicular to the first side of the support plate.

5. The anchor device according to claim 1, wherein the connection point comprises a hole configured to receive a pin for coupling the shackle with the connection point.

6. The anchor device according to claim 1, wherein the mooring bolt is arranged perpendicular to the first side of the support plate.

7. The anchor device according to claim 1, wherein the mooring bolt includes a plurality of annular notches.

8. The anchor device according to claim 1, wherein the second end portion of the protrusion has a protruding vertical portion in which a through hole of the connection point is arranged, the second end portion further including first and second recessed portions arranged on opposite sides of the protruding vertical portion.

9. The anchor device according to claim 1, wherein the support plate is configured to rest on the seabed and to cause stresses generated around the mooring bolt and connection point by the shackle to be transmitted to the seabed.

10. The anchor device according to claim 1, wherein the support plate is configured to rest on the seabed and to cause stresses generated around the mooring bolt and connection point by the shackle to be transmitted to the seabed.

11. A method of installing an anchor device used for anchoring a floating structure to a seabed using an anchor chain having a shackle coupled to an end portion of the anchor chain, the anchor device comprising: a mooring bolt configured to be inserted into a borehole drilled in the seabed; and a support plate having a first side for resting on the seabed and a second side opposite the first side, the support plate including a hole extending between and through the first and second sides in which the mooring bolt passes for being inserted into the borehole, the support plate including a connection point for coupling the shackle, the connection point being spaced horizontally apart from the hole, the support plate including a protrusion that projects vertically from the second side, the protrusion having a first end portion in which the hole through which the mooring bolt passes is arranged and a second end portion, opposite the first end portion, in which the connection points is arranged, the method comprising:
- drilling the borehole in the seabed;
- introducing a fixing material in the borehole;
- transporting the anchor device to the seabed; and
- introducing the mooring bolt of the anchor device in the borehole with the first side of the support plate resting on the seabed.

12. The method according to the preceding claim 11, wherein the anchor device is transported to the seabed together with the anchor chain with the shackle of the anchor chain being coupled to the connection point of the support plate.

\* \* \* \* \*